Nov. 10, 1931.  H. FALKENSTEIN  1,830,937
PISTON
Filed July 17, 1926
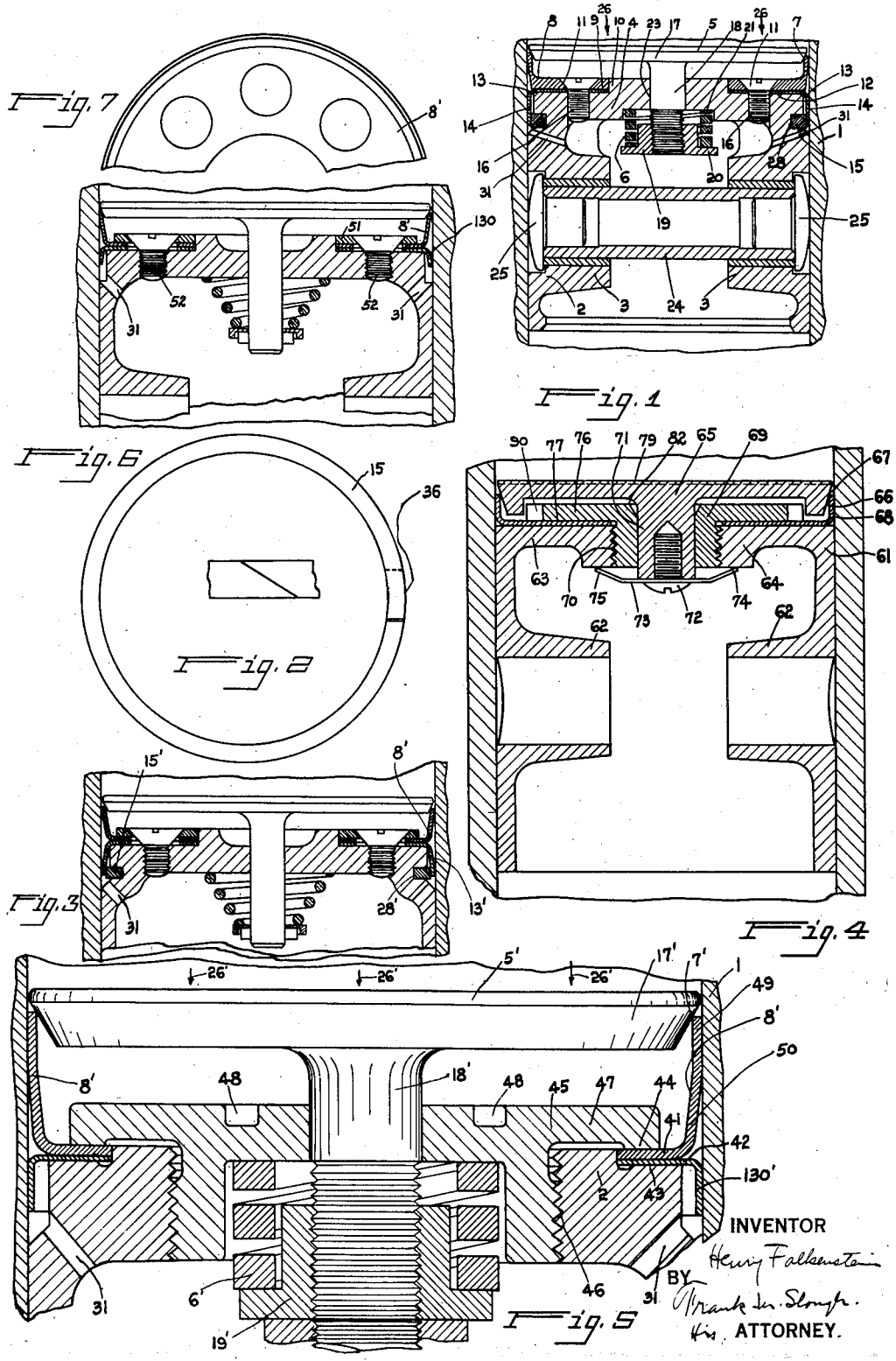
INVENTOR
Henry Falkenstein
BY Frank M. Slough.
His ATTORNEY.

Patented Nov. 10, 1931

1,830,937

UNITED STATES PATENT OFFICE

HENRY FALKENSTEIN, OF CLEVELAND, OHIO, ASSIGNOR TO THE GUARDIAN TRUST COMPANY, A CORPORATION OF OHIO

PISTON

Application filed July 17, 1926, Serial No. 123,057, and in Great Britain June 28, 1926.

My invention relates to pistons and relates particularly to pistons adaptable for use in cylinders of pumps, fluid operated brakes, rams, and the like, wherein it is important that there be a minimum of loss of pressure in the cylinder by leakage of the fluid contained under pressure therein.

An object of my invention is to effect an efficient peripheral seal adjacent the head of a piston which will effectively withstand high and low pressures contained within the cylinder wherein the piston is adapted to reciprocate.

Another object of my invention is to provide a piston which effects an adjacent seal against loss of pressure between the cylinder walls and the periphery of the piston, and which at the same time will be capable of being effectively lubricated without undue loss of lubricant past the piston.

Other objects of my invention and the invention itself will be apparent by reference to the following description of an embodiment of my invention, with modifications, and from the accompanying drawings illustrative thereof.

Referring to the drawings:

Fig. 1 shows a piston embodying the principles of my invention, a fragment of a cylinder being also illustrated, the view being mostly in longitudinal medial section;

Fig. 2 is a plan view of a spring metallic ring employed in the embodiment of Fig. 1;

Fig. 3 is a view similar to that of Fig. 1, of a modified form of my invention;

Fig. 4 is a view, similar to that of Fig. 1, of an embodiment of my invention;

Fig. 5 is an enlarged view of another embodiment of my invention;

Fig. 6 is a view similar to Fig. 1 of another embodiment of my invention; and

Fig. 7 is a plan view of a fragment of a sealing ring as employed in the embodiments of Figs. 3 and 6.

Referring first particularly to Fig. 1 of the drawings, at 1, I shows a cylinder wall within which a piston, having a trunk portion 2, wrist pin bosses 3 and a head end wall 4, is adapted to reciprocate, the piston comprising also a head 5, which is spring pressed by a compression spring 6 onto a seat 7 and which seat comprises an inner edge of the rim of a sealing cup element 8. The sealing cup element is annular in form, having a central opening in its end wall 9 to permit the cup to be fitted on the end wall 4 of the piston trunk, the central end wall opening receiving the central projection 10 of the end wall. Spaced machine screws 11 are provided at intervals, passing through countersunk openings 60 through the end wall 9 of the cup 8 to rigidly secure the cup by its end wall, upon the end wall of the piston trunk. Interposed between the end wall 9 of the cup 8 and the end wall 4 of the piston trunk is an end wall 12 of an inverted cup 13, the annular side walls 14 of which are expanded by an annular expansion ring 15, Fig. 2, against the inner walls of the cylinder 1. The machine screws 11 pass through aligned openings in the end wall of the cups 8 and 13 and are screw threaded into the piston trunk end wall, as at 16. The supplemental head 5 for the piston is of poppet valve form, having a lower peripheral beveled edge surface 17 in contacting seating engagement with the edge 7 of the cup 8, and has, moreover, an axially disposed depending integral stem 18 carrying at its end a compression spring retaining nut 19 having a hexagonal flange 20 against which an end of the compression spring 6 contacts, the compression spring being normally compressed between the flange 20 and the bottom surface 21 of the piston end wall 4, which may be suitably recessed for the purpose of receiving the upper end of the spring.

At 31 I show a series of perforations through the lateral piston trunk wall to permit communication from the interior of the piston trunk to the space below the oil scraping ring 15. Lubricant scraped from the cylinder walls by such a piston ring will be collected in the space below the piston ring.

The stem 18 passes through an axial opening 23 through the piston end wall 4, making sliding engagement with the walls of such opening. A wrist pin 24 is fitted within the bosses 3 and its middle portion is adapted to be secured to the end of a piston rod, not shown in the drawings, but which may be assumed to be provided in the manner such as is usual in such construction. The peripherally disposed rims of the cups 8 and 13 are both normally expanded against the walls 1 of the cylinder by the continuously applied pressure of expanding springs, that of the cup 8 being thus expanded by the conjoint action of the compression spring 6 and the beveled surface 17 of the head 5 acting upon the inner edge 7 of the cup rim, tending to force it outwardly and downwardly against the inherent resiliency and elasticity of the material of the cup. The rim portion 14 of the cup 13 is at the same time expanded against the cylinder walls by the power of the ring 15 which preferably is cut, as at 36, and which edge being cut is expanded sufficiently to pass it over the end of the piston trunk end wall 4 to permit it to snap into place within the peripheral recess 28. So placed, the ring 15 will be compressed, tending to expand peripherally; then the inverted cup 13 is pressed on the piston end wall and telescoped over the spring 15, forcibly, the while the spring 15 is additionally compressed to permit this being done. After this, the other cup 8, the head 5, spring 6 and nut 19, as well as the wrist pin 24, are placed on the trunk body and the piston inverted within the cylinder walls 1.

The cups 8 and 13 are preferebly of metallic material and are preferably of a composition which, while resilient, is yet not so hard that under the pressures prevailing, in practice, expanding the cup rings against the cylinder walls will cause scoring of the walls.

A material which I have found to be very suitable for the purpose comprises 86 per cent copper, 8 per cent zinc, 4 per cent aluminum, 2 per cent iron, although other materials varying in composition and in hardness and resiliency may be employed with good results under conditions of use suitable to such compositions.

Fluid pressure within the cylinder exerted against the upper surface of the piston 5 will tend to move it in the direction of the arrows 26 and will exert an outward expanding camming action upon the rim of the cup 8 adding to the expanding effect thereof accomplished by the spring 6 which is constantly effective, the fluid pressure effect being variable according to the amount of pressure in the cylinder at different periods of use. It is to be noted that the power tending to expand the rim of the cup at any moment is that due to the spring 6 tending to expand, plus the effect of fluid pressure upon the entire upper surface of the piston head and is affected by the multiplication factors representing the mechanical advantage of the cam comprising the beveled surface 17 of the head acting against the inner edge of the cup ring.

The cup ring by its inherent resiliency upon being caused to expand its outer peripheral surface adjacent its rim edge to contact with the cylinder walls, will resist the expanding effort but being overpowered by it according to the greater effect tending to expansion at the moment prevailing, whenever, the expanding effort is discontinued or reduced, sufficiently, the cup will contract its edge commensurably.

Referring now to Fig. 3, I show therein a pair of cup shaped sealing elements 8' and 13' which in this embodiment I preferably make of sheet metal suitably formed, as illustrated, and which are alike in form and which may be alike in composition, although for some purposes it may be preferably to vary the composition of one of these cups relative to the other and I contemplate such variation under certain conditions of use. It will be noted also that the embodiments of Figs. 3, 5 and 6, at 31, and 31' I have shown a plurality of perforations through the lateral piston trunk wall to permit communication from the interior of the piston trunk to the space below the oil scraping ring such as is illustrated at 13', Fig. 3, 130, Fig. 6 and 130', Fig. 5. In this way lubricant scraped from the cylinder walls by such a piston ring and contained in the space below such piston ring may be returned to the crank case or other lubricant containing reservoir and from which lubricant is supplied to the walls of the cylinder in any suitable way.

Fig. 5 shows an embodiment of my invention wherein the oil scraping ring 130' and the sealing ring of cup 8' are reversely disposed and together are clamped by their end walls 41 and 42 between a seat 43 on the piston trunk 2' and a clamping face 44 of a flanged separable end wall 45 which is secured to the trunk body portion interengaging screw threads, shown at 46, the clamping face 44 being provided on the under side of a downward projection of a peripheral flange 47 of the end wall suitable depressions 48 are provided in the face of the end wall for the reception of prongs of a suitable wrench for turning the end wall into place on the piston trunk, a piston head 5' having a stem 18' with threaded end carrying a flanged nut 19' and compression spring 6' are provided. as in Fig. 1, and for the same purposes of the like parts thereof. The ring element 8' is likewise in the form of an upright cup having a perforated end wall 41 and in this embodiment of my invention the side wall of the cup is formed with an upper cylindrical portion 49 and an inclined side wall portion 50 which joins the cylindrical portion to the end wall, the cylindrical portion is caused to contact at its outer surface with the inner walls of the cylinder 1 by outward camming pressure exerted by the beveled lower edge 17' of the piston head 5' against the intraperipheral rim edge 7' of the cup ring 8', pressure acting axially on the piston head 5' will, as in the other embodiments of my invention herein illustrated, force the sealing cup ring 8' against the cylinder walls and at the same time will effect a good seal against fluid pressure along the line of contact of the intraperipheral rim edge 7' of the cup and the lower beveled edge 17' of the head 5'.

Such pressure will be exerted at all times by the compressed spring 6' and will be exerted in the direction of the arrows 26' against the upper face of the piston head by virtue of the pressure of fluid which may be contained under pressure in the cylinder in which the piston is placed and above such piston head.

In Fig 4, I show another embodiment of my invention, comprising a piston trunk 61 of generally cylindrical form, having inwardly turned wrist pin receiving bosses 62 and an end wall 63, which comprises an apertured central portion in the form of an inwardly extending boss 64. The piston of Fig. 4 also comprises a head 65 which is inwardly beveled at 66 at its edge to form a seat for the head for engagement with a rim 67 of a metallic cup element 68, which is rigidly secured in upright position upon the end wall 63 of the piston trunk, by means of a flanged clamping screw 69, screw threaded at 70 into the threaded inner walls of the boss 64. The clamping screw 69 has an axial bore adapted to receive a stem 71 integral with and depending from the head 65. The end of the stem 71 projects beyond the end of the clamping screw 69 and has secured to it by a machine screw 72, a preferably star-shaped compression spring 73. The ends of the arms of each, as shown at 74 and 75, make pressing contact with the inner end of the boss 64. When the spring 73 is secured in place by the screw 72, it is compressed, and by its reaction, exerts a seating pressure upon the piston head 65. The flange 76 of the clamping screw 69 extends peripherally therefrom, and its lower surface 77 is clamped tightly down onto the end wall of the metallic cup 68 to clamp tightly against the end wall 63 of the piston trunk. A fluid pressure-proof joint is made between the flange 76 and the metallic cup and piston trunk end walls. The piston head may be formed with a depending annular flange 78 disposed intraperipherally of the flange 69, and having a lateral bevelled edge 66.

The cup 68 preferably has its side wall portions disposed relative to the cylinder side walls, as in the embodiment of my invention illustrated in Fig. 5, wherein a similar cup element, though having a larger central perforation through its end wall, likewise comprises a side wall portion adjacent the end wall but relieved from the cylinder side walls, the cup adapted to contact with the cylinder side walls, however, along a band of its outer peripheral surface, which is spaced from the cup end wall and which is disposed near to the rim of the cup.

It will thus be seen in the embodiment of my invention of Fig. 4, that the piston head 65 will, by virtue of the pressure of the compressed spring 73 and the effect of the fluid pressure receiving wall 79 and the camming contact had between the bevelled edge 66 of the head 65 and the cup ring, exert an outward camming action upon the cup ring to press the upper cylindrical portion thereof snugly into engagement with the cylinder walls.

It will be noted also that such fluid as may be received within the space 80 between the piston head and trunk portions will be largely restrained from passing the cup by virtue of the seal at the joint between the cup and the clamping surfaces of the flange 76 and the trunk end wall 63.

It will also be noted that by virtue of the depending flange 78 and the conformation of that side of the piston head adjacent the piston trunk, there will be little space for fluid intermediate the head and trunk.

In Fig. 6, I show an embodiment of my invention wherein the lower scraping ring 130 comprises side walls which are less easily deformed than are the side walls of the sealing cup 8', this being accomplished, in the embodiment illustrated, by making the side walls of the inverted cup 130 relatively short, and I secure the reversely disposed cups 8' and 130 by a clamping ring 51 which is perforated at intervals to receive the clamping screws 52 which are screw threaded into the end wall of the piston trunk or body. In the embodiment of Fig. 3, I preferably employ an expansion ring 15' which is seated within a peripheral groove 28' as in Fig. 1, and for the purpose of continuously maintaining the rim of the cup in engagement with the cylinder walls.

Having thus described my invention in certain embodiments, I am aware that numerous and extensive departures may be made from the embodiment herein illustrated and described but without departing from the spirit of my invention.

I claim:

1. In a piston for a cylinder, the combination of a substantially closed metallic cup portion having resilient metallic side wall portions, and a spring pressed cam continuously circumferentially stretching the side walls of the cup against the cylinder walls, in opposition to the retractive resilient effort of the cup side wall portions.

2. In a piston, a trunk therefor, a head spaced from the trunk, a metallic cup interposed between the head and trunk with its end wall resting upon the end wall of the trunk and its side walls supporting at their rim the head, said head adapted to move axially relative to the trunk towards the trunk, and when so moved, to effect an outward expanding effort upon the rim portions of the cup and a spring constantly exerting a compressive effort upon the head, tending to move it towards the trunk, the side walls of said cup being relieved from possible engagement with the cylinder side walls in portions of its outer surface adjacent the trunk, said cup end wall being perforated, and clamping means for the cup adapted to secure the cup by the end wall on the piston trunk comprising a hollow screw, having a flanged head, and a threaded stem projected through the end wall of the trunk and clamped thereto, an underside of the screw head making clamping engagement with the inner surface of the cup end wall and forcing it tightly against a portion of the end wall of the piston trunk.

3. In a piston, a trunk therefor, a head spaced from the trunk, a metallic cup interposed between the head and trunk with its end wall resting upon the end wall of the trunk and its side walls supporting at their rim the head, said head adapted to move axially relative to the trunk towards the trunk, and when so moved, to effect an outward expanding effort upon the rim portions of the cup and a spring constantly exerting a compressive effort upon the head, tending to move it towards the trunk, said cup being composed of a bronze alloy material, said cup end wall being perforated, and clamping means for the cup adapted to secure the cup by the end wall of the piston trunk comprising a hollow screw, having a flanged head, and a threaded stem projected through the end wall of the trunk and clamped thereto, the underside of the screw head making clamping engagement with the inner surface of the cup end wall and forcing it tightly against a portion of the end wall of the piston trunk, and forming a sealing engagement therewith.

4. In a piston, the combination with a piston trunk, a head wall therefor having an axial opening therethrough, a metallic cup having relatively thin side walls seated upon the end wall, the walls of the said opening being threaded, and a clamping screw having a flanged head and an axial bore being screw threaded within the opening, the flanged head adapted to securely clamp the end wall of the cup upon the end wall of the piston trunk, a piston head of disk form having a depending stem slidable in the clamping screw bore opening, a spring exerting a constant resilient effort to draw the disk head toward the trunk, said head adapted to communicate an outwardly camming effort upon the side walls of the cup to a degree commensurable with the pressure exerted by said spring and to increase the outward camming effort upon said piston head, said head having an annular flange projecting therefrom adjacent its peripheral portion into the space between the cup side walls and the periphery of said clamping screw flange.

5. In a piston, in combination with a piston trunk and an end wall therefor having an axial opening therethrough, a metallic cup having relatively thin side walls supported upon the end wall, the walls of the said opening being threaded, and a clamping screw having a flanged head and an axial bore being screw-threaded within the opening, the flanged head being adapted to securely clamp the end wall of the cup upon the end wall of the piston trunk, a piston head of disk form having a depending stem slidable in the clamping screw bore opening, a spring exerting a constant resilient effort to draw the disk head toward the trunk, said head being adapted to communicate an outwardly camming effort upon the side walls of the cup to a degree commensurable with the pressure exerted by said spring and to increase the outward camming effort upon said piston head, said spring reacting at one portion upon the head wall of the piston trunk and at another portion upon the stem of the disk form head.

6. In a piston, in combination with a piston trunk and an end wall therefor having an axial opening therethrough, a metallic cup having relatively thin side walls supported upon the end wall, the walls of the said opening being threaded, and a clamping screw having a flanged head and an axial bore being screw-threaded within the opening, the flanged head being adapted to securely clamp the end wall of the cup upon the end wall of the piston trunk, a piston head of disk form having a depending stem slidable in the clamping screw bore opening, a spring exerting a constant resilient effort to draw the disk head toward the trunk, said head adapted to communicate an outwardly camming effort upon the side walls of the cup to a degree commensurable with the pressure exerted by said spring and to increase the outward camming effort upon said piston head.

7. In a piston, in combination with a piston trunk and an end wall therefor having an axial opening therethrough, a metallic cup having relatively thin side walls supported upon the end wall, the walls of the said opening being threaded, and a clamping screw having a flanged head and an axial bore being screw-threaded within the opening, the flanged head being adapted to securely clamp the end wall of the cup upon the piston trunk, a piston head of disk form having a depending stem slidable in the clamping screw bore opening, a spring exerting a constant resilient effort to draw the disk head toward the trunk, said head being adapted to communicate an outwardly camming effort upon the side walls of the cup to a degree commensurable with the pressure exerted by said spring and to increase the outward camming effort upon said piston head, said spring reacting at one portion upon the clamping screw and at another portion upon said stem.

8. In a piston, in combination with a piston trunk and an end wall therefor having an axial opening therethrough, a metallic cup having relatively thin side walls supported upon the end wall, the walls of said opening being threaded, and the clamping screw having a flanged head and a stepped axial bore being screw-threaded within the opening, the flanged head being adapted to securely clamp the end wall of the piston trunk, a piston head of disk form having a depending stem slidable in the smaller portion of the stepped bore of the clamping screw, a spring reacting between the step of the bore and the said stem, and exerting a constant resilient effort to draw the disk head toward the trunk, said head being adaped to communicate an outwardly camming effort upon the side walls of the cup to a degree commensurable with the pressure exerted by said spring and to increase the outward camming effort upon said piston head.

In testimony whereof I hereunto affix my signature this 15th day of July, 1926.

HENRY FALKENSTEIN.